United States Patent [19]

Jutte, Jr. et al.

[11] Patent Number: 5,079,078
[45] Date of Patent: Jan. 7, 1992

[54] FIRE-RESISTANT PANEL SYSTEM

[75] Inventors: Ralph B. Jutte, Jr., Hebron; Allan B. Isham, Newark; Edward L. Wilson, Newark; David R. Hartman, Newark, all of Ohio

[73] Assignee: Owens-Corning Fiberglas Corp.

[21] Appl. No.: 471,328

[22] Filed: Jan. 29, 1990

[51] Int. Cl.$^5$ ............................................. B32B 7/00
[52] U.S. Cl. ........................... 428/251; 264/257; 428/229; 428/246; 428/703; 428/902; 428/920; 428/284; 428/285
[58] Field of Search ............ 428/284, 285, 251, 703, 428/920, 246, 902, 229; 264/257

[56] References Cited

U.S. PATENT DOCUMENTS

| | | | |
|---|---|---|---|
| 4,076,873 | 2/1978 | Shea | 428/35 |
| 4,282,687 | 8/1981 | Teleskivi | 49/503 |
| 4,361,613 | 11/1982 | Bogner et al. | 428/119 |
| 4,364,911 | 12/1982 | Byrd et al. | 428/265 |
| 4,735,841 | 4/1988 | Sourdet | 428/116 |
| 4,935,281 | 6/1990 | Tolbert et al. | 428/116 |

*Primary Examiner*—James J. Bell

[57] ABSTRACT

Panels are disclosed which are suitable for joiner, non-structural bulkheads.

The panels are a laminate having a central portion of gypsum or a magnesium oxy-chloride cement which may or may not be glass fiber reinforced and externally exposed fire-resistant skins directly bonded to opposite sides of the central or core material. These skins are formed of a solid phenol-formaldehyde glass resin composite such as for example a prepreg formed from a woven glass roving of a high strength, high melting point glass and a cured phenol-aldehyde resin.

13 Claims, No Drawings

FIRE-RESISTANT PANEL SYSTEM

TECHNICAL FIELD

The present invention relates to glass fiber composite articles and more particularly it relates to laminated glass fiber composite articles which include an inorganic core. Even yet more particularly the present invention relates to fire-resistant glass fiber composites having utility as joiner, or non-structural bulkheads.

BACKGROUND OF THE ART

There is a need in the art for fire and smoke resistant panels. This need is especially acute on naval ships. In recent years it has been determined that the effects of smoke and toxic gases is one of the leading causes of injury and death resulting from fires Thus, it will be apparent that construction materials such as joiner, or non-structural, bulkheads on naval vessels are needed which produce virtually no toxic gases and exhibit low smoke. Additionally, it will be apparent that there is also a need for construction materials which do not themselves significantly help to spread flames and which have low heat transfer coefficients. With a low heat transfer coefficient, one side of a panel will not become dangerously hot notwithstanding exposure of the alternate side to high flame temperatures. Finally, there is a need in the art that these materials exhibit very low burn-through in order to minimize spreading the fire Aluminum construction materials are unsuitable for the above purposes Not only can aluminum burn but it also obviously loses its structural integrity. Thus it causes further conflagration problems. Recently a composite construction has been evaluated which includes a panel having glass reinforced skins over a high strength polymeric honeycomb structure First of all the honeycomb structure has proved not to be suitable. During a fire, the entrapped air in the hollow honeycomb structure expands causing a pressure build-up. This pressure build-up has, in turn, resulted in delamination of the externally disposed skins Additionally, such structures have not exhibit the desired smoke resistance, fire spread resistance, and burn-through resistance.

In accordance with this invention, the foregoing need in the art is now satisfied. The present invention provides for a panel structure which has outstanding fire-resistant qualities. It is a low smoke emitting panel. It does not release toxic gases, possesses a low heat transfer coefficient and shows remarkable resistance to "burn-through".

DISCLOSURE OF THE INVENTION

In accordance with the present invention the above need in the art is satisfied by providing for a laminated fire-resistant panel which can be safely used as a joiner bulkhead. The panel comprises a core, or central portion, of a solid fire-resistant gypsum or magnesium oxychloride cement and outwardly disposed fire-resistant skins bonded to opposite sides of the core material. The outwardly disposed skins comprise a high density composite of glass fibers and a cured thermoset phenolic resin. When reference is made to high density this means that the skins typically have a density substantially higher than that of a compressed insulating batt. A traditional thermal insulating batt when compressed may have a density typically on the order of about 5–7 lbs. per cubic foot or perhaps as much as 12 lbs. per cubic foot In contrast, however, the skins of the present invention typically have densities on the order of about at least 100 lbs. per cubic foot and typically in the range of about 118–125 lbs. per cubic foot. It will also be observed that the core is a solid material that is, it is not hollow like a honeycomb structure. Thus, the present panel design does not experience air pressure build-up within the structure when it is heated and exposed to fire. It, therefore, will not delaminate.

In its usual construction the panel will contain about 20–50% by weight of the skins and the skins will usually contain at least about 75 or 78% by weight of glass and more typically about 78% by weight to about 85% by weight of glass. Areal densities of at least about 2 lbs. per square foot are usually preferred. Outstanding results have been obtained using panels having an areal density of about 2.4 to about 2.5 lbs. per square foot with thicknesses between about 0.4–0.6 inch. The overall combustible organic content of the panel will generally be less than about 10%. Each of the skins preferably have thicknesses on the order of about 0.040 inch but this may, of course, vary.

DESCRIPTION OF THE INVENTION

The core or central portion of the laminates are formed from gypsum or magnesium oxy-chloride cement. These materials, if desired, may be reinforced with glass fibers. Additionally, either of these core materials can be used with a paper facing. Thus, for example, gypsum drywall board can be purchased with paper facing and employed as such.

Gypsum itself, without the skins, would be unsuitable because it has inadequate strength for even minor structural bearing loads.

The externally disposed skin portions, or outside sections, of the panel of this invention are a phenolic and glass fiber composite. Most desirably the panels of this invention will be provided with skins which are formed from "prepreg" materials. Prepreg materials are well known in the art and represent solid bodies which contain a thermosettable resin enveloping a fibrous reinforcement, most typically a mat. In the present instance it is preferred to employ prepreg materials obtained by impregnating woven glass roving with a phenolic material. In order to obtain best results the glass fibers, and more specifically the woven glass roving, will be formed of a high strength magnesia alumina-silicate glass having a high melting point (greater than about 1700° F), which is available from Owens-Corning Fiberglas Corporation under their glass designation "S-2" glass. Phenolic resin as referred to herein contemplates phenol-aldehyde, for example phenol-formaldehyde, resin and includes resorcinol-aldehyde and phenol-resorcinol-aldehyde resins. Such resins are generally known in the art for their low smoke characteristics and are widely commercially available.

In the preferred embodiment of this invention prepregs are employed and the prepregs are formed by coating, or impregnating, a glass fiber mat, for example an S-2 woven roving, with a solution of a partially condensed further condensable low molecular weight phenolic, preferably a phenol-formaldehyde resole reaction product. Prepregs contemplated for use in accordance with the preferred technique of this invention can be formed in accordance with the teachings of U.S. Pat. No. 4,842,923.

In the usual practice of the invention the prepregs and core will be laminated into a single piece unitary article by compression molding techniques. Thus, for example, the articles can be formed by positioning several prepregs, typically three, into the bottom of a compression mold then positioning the core material thereover and then inserting an equal number of prepregs on top of the core material. The laminate is then formed by compression molding. Pressure, time and temperature will be routinely selected by those skilled in the art.

The magnesia alumina-silicate glass fibers which according to the preferred embodiment of this invention are employed are high strength fibers and typically have tensile strengths in excess of about 500,000 psi. These fibers are roughly about ⅔ by weight silica and typically on the order of about 65% by weight silica and about ⅓ being magnesia and alumina with the alumina being present in a greater amount than the magnesia. Typically alumina will be about 25% by weight and magnesia about 10% by weight. Best results will be obtained when these fibers have a water resistant impact debondable size coating thereon. Further details in this respect may be had by reference to the above-noted U.S. Pat. No. 4,842,923.

In forming the panel of the present invention, the combustible organic content of the panel will generally be less than about 10% by weight. The skins typically will contain at least about 75% by weight of glass fibers.

Outstanding results have been obtained when the panels which were formed had an areal density of about 2.4 to about 2.5 lbs. per square foot, a total thickness of about 0.4–0.6 inch on each of the respective skins having a thickness of about 0.040 inches.

The uniqueness of the present panel, perhaps, may best be put in perspective by reference to U.S. Pat. No. 4,282,687 entitled "FIRE RESISTANT STRUCTURE". Unlike that structure, the present panel is essentially free of any timber fiber board. This of course contributes to improved fire-resistance. The reinforced phenolic skins of the present invention are hard and substantially incompressible. These skins are unlike the mineral fiber compressed batts disclosed in U.S. Pat. No. 4,282,687. Compressed insulating batts are relatively soft and further compressible. That is the surface for example of a compressed mineral fiber, or compressed fiberglass, batt can be relatively easily penetrated with only slight hand pressure using a sharp object. In contrast the solid skins employed in the present invention cannot be punctured or penetrated with only slight hand pressure with a sharp object. The skins of the present invention are, for all practical purposes, incompressible whereas compressed batts can be further compressed with the exertion of modest pressure. As has already been pointed out, the skins of the present invention are high density materials whereas compressed mineral fiber batts are low density materials.

The following will show some important property characteristics of the skins of this invention. These properties of the skins are material factors in providing a panel with the outstanding characteristics it possesses.

First of all prepregs were formed and these prepregs were then compression molded to form only a skin portion of the panels of the present invention. This was done following the teachings of the Example in U.S. Pat. No. 4,842,923. The final molded prepegs contained about 20% by weight of phenolic resin and about 80% by weight of the S-2 woven fiberglass roving. The overall thickness was about ⅛ inch. This material was then contrasted with another potential skin material in which a brominated vinyl ester is used along with aramid fibers. Laminate materials of this potential skin are similarly formed into prepregs followed by compression molding to produce substantially an equivalent thickness material.

The Flame Spread Index was determined in accordance with ASTM method E-162-75 The NAVSEA (Naval Sea Systems Command) maximum allowable level on this test is 25. The vinyl ester material shows a flame spread index of about 13 whereas the skin of the present invention showed a Flame Spread Index of about 1-2.

Smoke obscuration and fire performance was evaluated using ASTM STP-422 (E-662). Both the flaming and smoldering methods were employed. In the flaming method the skins of contemplated for use in the present invention had a percent light transmission of approximately 55% and in the smoldering method they had a percent light transmission of around 95%. In contrast the vinyl ester comparative material generally shows virtually no light transmission in the flaming method and approximately 5% in the smoldering method. In terms of smoke obscuration index number, NAVSEA has a maximum allowable level of 250. In the flaming mode of testing, the smoke obscuration index value for the skins of the present invention was approximately 30 and for the smoldering mode about 2. Comparative vinyl ester materials have a flaming smoke obscuration of slightly in excess of 375, and the smoldering test exhibits a value of slightly in excess of 125.

The Limiting Oxygen Index at 23° C. for the present skins was approximately 56° and at 150° C. was approximately 75. In contrast vinyl ester materials show oxygen indexes of 39° at 23° C. and 39° also at 150° C. It will thus be apparent that the ability to sustain a flame will be much more difficult when employing skins contemplated for use in the present invention.

The values reported above for the present skins with respect to the Flame Spread Index were taken from data published by Fiber Materials, Inc. for phenolic prepreg laminates. Additionally, the data reported above for the vinyl ester was data taken from NSWC (Naval Surface Weapons Center) Report 80-302.

EXAMPLE

Panels contemplated for use in the present invention were produced as follows. Prepreg materials were first of all produced in accordance with the Example set forth in U.S. Pat. No. 4,842,923. A panel was then produced by positioning three of such prepregs in a mold and then positioning, in one case, a ½ inch paper faced gypsum board and, in another case, a ⅜ inch gypsum board thereover, followed by then positioning three more prepreg materials on each of those composites. The panel was then formed by compression molding under a pressure of about 50-100 psi, at a temperature of about 350° F. for about 20-30 minutes. The thickness of the panel employing the ½ inch gypsum board was about 0.59 inch and the areal density was about 2.74 lbs. per square foot. The panel with the ⅜ inch gypsum board at a thickness of about 0.47 inch and an areal density of about 2.41 lbs. per square foot. Excellent bonding and laminating was achieved between the prepregs and the gypsum board. Moreover, during molding, even entrapped moisture in the non-cellular core material was easily released through the phenolic skin. In contrast, however, when prepregs were employed in which a fiber reinforced thermosetting polyester was employed, instead of the phenolic, steam entrapment resulted and the skins delaminated during molding.

The panels contemplated for use in the present invention were then evaluated by the FAA Flame Impingement Test (Jet-A), often referred to as the Burn-Through test. In this test a flame is directly impinged upon a substrate of prescribed dimension with hot air being blown continually over the exposed substrate so as to expose fresh surface. The flame temperature generally was between about 2200°–3000° F. After 30 minutes of operation neither of the panels of this invention showed a back side temperature in excess of 300° F. (when measured 3 inches from the back surface). In fact even after one hour the temperature still had not reached 300° F. In contrast, conventional, state of the art aluminum faced honeycomb core panels burn-through in less than five minutes.

While the foregoing shows the outstanding qualities of the present invention for use in applications requiring flame-resistance, nonetheless modifications are possible which pursuant to the patent statutes and laws do not depart from the spirit and scope of this invention.

We claim:

1. A laminated fire-resistant panel suitable for use as a joiner bulkhead comprising a core portion of a solid fire-resistant gypsum or magnesium oxychloride cement, optionally having paper facing, and fire-resistant skins directly bonded to opposite sides of said core material said skins comprising an incompressible high density composite of glass fibers and a cured phenolic resin.

2. The laminated fire-resistant panel of claim 1 wherein said skins are molded to opposite sides of said core material.

3. The panel of claim 2 wherein said fibers are in the form of a woven glass roving.

4. The panel of claim 2 wherein the total combustible organic content of said panel is less than about 10% by weight and the skins contain at least about 75% by weight of said glass fiber.

5. The panel of claim 4 wherein said panel has an areal density of about two to about 2.5 lbs. per square foot, a total thickness of about 0.4–0.6 inch and each of the skins has a thickness of about 0.040 inch.

6. A fire-resistant panel suitable for use as a joiner bulkhead and having Smoke Obscuration Indices (ASTM-E-622) for both Flaming & Smoldering Conditions of less than 250 and a Flame Spread Index of less than three; said panel including a core portion of gypsum board, optionally having paper facing, and opposed incompressible high density skins molded to opposite sides of said core portion, said skins each comprising a laminated portion of a plurality of prepreg layers of a woven fiber roving of magnesia aluminosilicate glass having a phenolic resin, said panel containing less than about 10% by weight resin and having an areal density of at least about 2 lbs. per square foot.

7. The panel of claim 4 wherein said skins consist of said composite of glass fibers and cured phenolic resin.

8. The panel of claim 4 wherein said skins are compression molded.

9. The panel of claim 6 wherein said phenolic is capable of releasing entrapped moisture during molding.

10. The panel of claim 9 wherein said skins consist of said layers.

11. The panel of claim 6 wherein said skins are compression molded to said opposite sides.

12. The panel of claim 11 wherein the organic content of said panel is less than about 10% by weight, said panel has an areal density of about 2 to about 2.5 lbs per square foot and wherein said skins have a density of at least about 100 lbs. per cubic foot.

13. A compression molded fire-resistant laminate suitable for use as a naval joiner bulkhead and consisting of a gypsum or magnesium oxy-chloride cement core member, optionally having a paper facing, and molded to opposite sides of said member a high density, incompressible skin consisting of glass fibers and a cured phenolic resin, the organic content of said panel being less than about 10% by weight and said phenolic being capable of releasing entrapped moisture during compression molding.

* * * * *